United States Patent
Lyons et al.

(10) Patent No.: US 6,620,878 B1
(45) Date of Patent: Sep. 16, 2003

(54) AQUEOUS POLYMERIC EMULSION COMPOSITIONS

(75) Inventors: Ian Russell Lyons, Shipley (GB); Howard Roger Dungworth, Halifax (GB)

(73) Assignee: Ciba Speciality Chemicals Water Treatments Limited, Bradford (GB)

(*) Notice: Subject to any disclaimer, the term of this patent is extended or adjusted under 35 U.S.C. 154(b) by 0 days.

(21) Appl. No.: 09/936,334
(22) PCT Filed: Feb. 28, 2000
(86) PCT No.: PCT/EP00/01671
§ 371 (c)(1), (2), (4) Date: Sep. 12, 2001
(87) PCT Pub. No.: WO00/57433
PCT Pub. Date: Sep. 28, 2000

(30) Foreign Application Priority Data

Mar. 18, 1999 (GB) .............................................. 9906149

(51) Int. Cl.$^7$ .............................................. C08L 33/02
(52) U.S. Cl. ........................ 524/515; 524/522; 524/523; 524/510; 524/537; 524/831; 524/458; 427/512; 427/513; 427/516; 174/107; 174/119 C; 174/121 A; 106/14.41; 106/14.05; 252/184
(58) Field of Search ................................. 524/515, 522, 524/525, 510, 537, 831, 458, 460, 767; 427/512, 513, 516; 174/107, 119 C, 121 A; 106/14.41, 14.05; 252/184

(56) References Cited

U.S. PATENT DOCUMENTS

| | | | |
|---|---|---|---|
| 3,947,399 A | 3/1976 | Sekmakas .................. 260/29.6 |
| 4,059,552 A | * 11/1977 | Zweigle et al. ............. 524/555 |
| 4,337,159 A | 6/1982 | Reed et al. ................ 252/8.55 |
| 4,434,268 A | 2/1984 | Doroszkowsky et al. ... 524/520 |
| 4,562,226 A | * 12/1985 | Coombes et al. ........... 524/602 |
| 4,977,208 A | * 12/1990 | Hosoya et al. .............. 524/515 |
| 5,631,317 A | 5/1997 | Ikuko et al. |
| 6,103,317 A | * 8/2000 | Asai et al. .................. 427/512 |

FOREIGN PATENT DOCUMENTS

| | | |
|---|---|---|
| EP | 0115694 | 8/1984 |
| EP | 0190892 | 8/1986 |
| EP | 0358385 | 3/1990 |
| GB | 2054613 | 2/1981 |
| GB | 2078281 | 1/1982 |
| GB | 2095264 | 9/1982 |

OTHER PUBLICATIONS

Derwent Abstr. 87–337108 [48] for JP 62240303 (1987).
Derwent Abstr. 83–774194 for JP 58141231 (1983).

* cited by examiner

*Primary Examiner*—David W. Wu
*Assistant Examiner*—Satya Sastri
(74) *Attorney, Agent, or Firm*—David R. Crichton

(57) ABSTRACT

A pourable liquid composition comprising water, a water soluble or water swellable organic polymer, comprising 25 to 90 mole % monomer or monomers selected from the group consisting of $C_8$–$C_{30}$ alkyl ethoxylated (meth) acrylates, $C_8$–$C_{30}$ alkyl ethoxylated (meth)acrylamides, $C_8$–$C_{30}$ alkyl (meth)allyl ethers and $C_8$–$C_{30}$ alkyl ethoxylated (meth)allyl ethers, an organic water miscible liquid selected from the group consisting of $C_{1-5}$ alcohols, $C_{3-5}$ ketones, $C_{2-5}$ esters and $C_{2-5}$ ethers, characterized in that the organic polymer is present as discrete particles of average diameter size of below 10 microns. A process of imparting water resistance to the components of a cable said process by first contacting one or more of said components of a cable with said pourable liquid composition, and then assembling the components to form the cable. The composition is particularly suitable for protecting optical fibers within a fiber optic cable against the ingress of water.

15 Claims, No Drawings

AQUEOUS POLYMERIC EMULSION COMPOSITIONS

The present invention relates to novel pourable liquid compositions comprising a water soluble or water swellable polymer. The invention also relates to methods and processes for improving water or moisture resistance and/or preventing water ingress into an article such as a cable.

Polymer compositions can be prepared in a variety of fluid forms. For instance it is common practice to prepare dispersions of water soluble or water swellable polymer particles in a water immiscible hydrocarbon liquid. Such compositions are usually prepared by reverse phase emulsion polymerisation of water soluble monomers, optionally followed by azeotropic dehydration. Such polymers can be dissolved or hydrated in water by mixing the reverse phase emulsion or dispersion with water, optionally in the presence of an activator surfactant. Such compositions could be used as flocculants for instance for dewatering or thickening aqueous suspensions.

It is also known to prepare water soluble or water swellable polymers as dispersions in aqueous liquids. In such known compositions the aqueous liquids comprise dissolved inorganic salts and/or dissolved water soluble polymers and/or dissolved surfactants. Although such fluid compositions are pourable they are generally more viscous than the above reverse phase emulsions and dispersions and furthermore would contain less dispersed phase water soluble or water swellable polymer. Such aqueous based dispersions of water soluble or water swellable polymer may be prepared by polymerisation of water soluble monomers in the presence of the said aqueous liquid comprising dissolved inorganic salts and/or dissolved water soluble polymers and or dissolved surfactants.

Alternatively is also possible to prepare such aqueous based dispersions of water soluble or water swellable polymer by dispersing finely divided particles of preformed polymer into said aqueous liquid comprising dissolved inorganic salts and/or dissolved water soluble polymers and or dissolved surfactants. Such compositions could be used as flocculants for instance for dewatering or thickening aqueous suspensions.

Solutions of an associative polymer in a mixture of water and polar solvent, such as alcohols and ethers are described in EP-A-358385. In such polymer solutions the amount of polymer in the polymer solutions would be generally below 30% and most preferably 5 to 15%, based on the total solution. The amount of polar solvent is generally between 5% and 20% of the polar solvent water mixture. The polymer solution would have a viscosity of below 30,000 cps, for example below 5,000 cps. The viscosity of such polymer solutions increase at least three fold upon further dilution with water. Such compositions would generally be suitable as viscosifying agents for aqueous based systems.

It is known to impart water resistance to various water sensitive materials such as paper or cardboard. Such compositions would generally be water insoluble polymers that form an impervious barrier to water or moisture.

Solutions of resinous materials in a hydrocarbon solvent for application to substrates such as wood to provide a water resistant barrier are well documented.

In the field of cable manufacture it is normal practice to apply water resistant or water absorbent materials in the form of powders to prevent the ingress of water.

In fibre optic cables care must be taken to prevent water from contacting the glass fibre as this could result in water being transmitted along the optical fibre and thus lead to the loss of light transmittence through large sections of cable.

When making fibre optic cables it is common to surround individual optical filaments with oil based greases or superabsorbent powders. Greases are normally injected into the preformed cable by an injection process, such that the grease fills the interstitial spaces between the optical fibres and the outer casing. A disadvantage of grease is that if the outer casing of the cable becomes ruptured the grease can actually seep from the cable which could result in the internal fibres becoming exposed to water penetrating the cable.

Other means for imparting water resistance to fibre optic cables is by the application of water absorbent powders. The powders would surround the optical fibres in the void between the optical fibres and the outer casing of the cable. Typically the water absorbent powders are coated onto tape and and wrapped around the optical fibres. The water absorbent powders have the disadvantage of not providing a complete barrier to water.

In both WO-A-9637900 and WO-A-9637901 processes are proposed for providing water resistance to optical fibres. In each reference the optical fibres are passed through a coating die from which a liquid mixture of absorbent and polymerisable material is applied and then passing the fibres through a UV emitter where the liquid coating is cured. The liquid mixture is said to contain no or very little water or volatile organic solvent in order to avoid a heating step. However the process relies upon polymerising the polymerisable material in situ, which in the absence of sufficient water or other solvent could inhibit the mobility of radicals and the polymerisable material and result in some unpolymerised material, which could impair the effectiveness in providing sufficient water resistance. On the other hand where the liquid mixture does contain sufficient water to allow mobility of polymerisable molecules and radicals the polymerisation is more likely to be complete but without a drying stage would still hold the water or solvent within the polymerised matrix. It is possible that such water or solvent could subsequently evaporate resulting in shrinkage and possible damage to the coating thus resulting impaired effectiveness in providing sufficient water resistance.

It would therefore be desirable to provide water or moisture resistance to optical fibres within a cable by a simple means of application.

Thus in a first aspect of the invention a novel composition is provided which amongst other uses may be applied to optical fibres to provide water and/or moisture resistance.

The first aspect of the invention is a pourable liquid composition comprising, water, a water soluble or water swellable organic polymer, comprising 25 to 90 mole % monomer or monomers selected from the group consisting of (meth)acrylamide, (meth)acrylic acid or salts thereof and 10 to 75 mole % monomer or monomers selected from the group consisting of $C_{8-30}$ alkyl (meth)acrylates, $C_{8-30}$ alkyl ethoxylated (meth)acrylates, $C_{8-30}$ alkyl (meth)acrylamides, $C_{8-30}$ alkyl ethoxylated (meth)acrylamides, $C_{8-30}$ alkyl (meth)allyl ethers and $C_{8-30}$ alkyl ethoxylated (meth)allyl ethers, and an water miscible organic volatile liquid, characterised in that the organic polymer is present as discrete particles of average diameter size of below 10 microns. Preferably the organic volatile liquid is selected from the group consisting of $C_{1-5}$ alcohols, $C_{3-5}$ ketones, $C_{2-5}$ esters and $C_{2-5}$ ethers, Furthermore the pourable liquid composition is usually a stable dispersion of polymer particles. Thus the dispersed particles of polymer remain suspended and substantially free from settlement. The dispersion preferably remains stable for at least 30 days. More preferably the dispersion will have a stability of at least six months, most preferably 12 months.

The composition may contain at least 20 weight % water based on total weight of composition. Preferably the amount of water present in the composition is in the range 20 to 40 weight %, more preferably in the range 25 to 30 weight %.

The composition comprises dispersed particles of water soluble or water swellable polymers. The polymers may be formed entirely from an ethylenically unsaturated water soluble monomer or from a mixture of ethylenically unsaturated water soluble monomers. Water solubility is expressed in terms of the monomer having a solubility in deionised water at 25° C. of at least 10 weight %.

The ethylenically unsaturated water insoluble monomers are present in an amount of 10 to 75 mole %. Preferably though the amount of ethylenically unsaturated water insoluble monomer is between 10 and 50 weight %, more preferably 20 to 40 weight % most preferably around 30 weight %.

It is also possible to include into the monomer mixture ethylenically unsaturated amphiphilic monomers such as $C_{8-30}$ alkyl ethoxylated (meth)allyl ethers, $C_{8-30}$ alkyl ethoxylated(meth)acrylate and $C_{8-30}$ alkyl ethoxylated (meth)acrylamide. Typically such ethylenically unsaturated amphiphilic monomer could be present in the monomer mixture in an amount up to 20 weight %. Preferably this would be between 1 and 15 weight %, more preferably between 5 and 10 weight %.

Desirably the polymer comprises 25 to 75 mole %, preferably 50 to 60 mole %, monomer or monomers selected from the group consisting of (meth)acrylamide, (meth)acrylic acid or salts thereof, and 25 to 75 mole %, preferably 40 to 50 mole % monomer or monomers selected from the group consisting of $C_{8-30}$ alkyl (meth)acrylates, $C_{8-30}$ alkyl ethoxylated (meth)acrylates, $C_{8-30}$ alkyl (meth)acrylamides, $C_{8-30}$ alkyl ethoxylated (meth)acrylamides, $C_{8-30}$ alkyl (meth)allyl ethers and $C_{8-30}$ alkyl ethoxylated (meth)allyl ethers.

Where the polymer is formed from a higher proportion of water soluble monomer, for example above 60 mole %, particularly above 70 or 80 mole % it may be desirable for the polymer to be branched or cross linked. This can be effected by including a polyethylenically unsaturated monomer into the monomer mix. The polyethylenically unsaturated monomer is for instance a compound pocessing at least two ethylenically unsaturated moieties. Typically such polyethylenically unsaturated monomers include methylene-bis-acrylamide, tetra allyl ammonium chloride, divinylbenzene. The amount of polyethylenically unsaturated monomers is typically between 100 mole ppm and 5 mole %, for instance 1000 mole ppm to 2 mole %, in particular around 1 mole %.

It may also be possible to effect cross linking by other means, for instance multi functional compounds which react with two or more monomer molecules or pendant groups of the polymer. For instance it would be possible to effect cross linking of the polymer using compounds of multivalent metals, for instance aluminium or zirconium compounds where there are suitable functional groups to react with, for instance carboxylic acid groups.

The organic water miscible liquid is $C_{1-5}$ alcohols, $C_{3-5}$ ketones or $C_{2-5}$ ethers. Specifically this includes methanol, ethanol, n-propanol, isopropanol, tertiary butanol, acetone, dimethyl ether, methyl ethyl ether, diethyl ether and iso-propyl methyl ether and any other water miscible volatile alcohol, ether or ketone.

A method is also provided for preparing a pourable liquid composition comprising, water, a water soluble or water swellable organic polymer, an organic water miscible liquid selected from the group consisting of $C_{1-5}$ alcohols, $C_{3-5}$ ketones, $C_{2-5}$ esters and $C_{2-5}$ ethers, characterised in that the organic polymer is present as discrete particles of average diameter size of below 10 microns.

The composition is prepared by first providing a solution of ethylenically unsaturated monomer or monomers in a mixture of water with at least one of $C_{1-5}$ alcohols, $C_{3-5}$ ketones $C_{2-5}$ esters and $C_{2-5}$ ethers and optionally including a surfactant or a polymerisation stabilier. Where a stabiliser is included it may be applied in an amount of up to 2 weight %, based on total weight of water and organic liquid. Generally, however the surfactant is added in an amount of between 0.25 and 1 weight %. Any known commercially available surfactants may be used provided that they dissolve in or miscible with the mixture of water and organic liquid.

Polymerisation may be carried out in any number of standard ways. For instance polymerisation may be initiated by the use of standard redox initiator couple, optionally using a thermal initiator. The initiators are generally employed in an amount up to 0.5 weight % based on total weight of monomer, normally between 0.005 and 0.05 weight %.

Finely divided particles of polymer precipitate during the polymerisation to form a stable dispersion of polymer particles of average particle size diameter less than 10 microns in the mixture of water and organic liquid. Preferably the average particle diameter is between 500 nanometers and 2 microns, especially between 750 nanometers and 1 micron.

Another aspect of the invention relates to a method of improving the water or moisture resistance of an article and/or preventing ingress of water into an article by contacting the said article with a pourable liquid composition, wherein the composition comprises, a water soluble or water swellable organic polymer characterised in that either, (a) the polymer comprises 90 to 100 mole % units of (meth)acrylic acid or salts thereof and 0 to 10 mole % hydroxyethyl acrylate, (b) the composition additionally comprises an organic water miscible liquid selected from the group consisting of $C_{1-5}$ alcohols, $C_{3-5}$ ketones and $C_{2-5}$ ethers, or (c) the polymer is present as discrete particles of average diameter size of below 10 microns in an aqueous or non-aqueous liquid.

In one preferred form, the composition comprises an aqueous solution of a polymer comprising 90 to 100 mole % units of (meth)acrylic acid or salts thereof and 0 to 10 mole % hydroxyethyl acrylate. The polymer may be in free acid form but is preferably an alkali metal or ammonium salt, especially the sodium or potassium salt.

In one other aspect the article is contacted with a composition which is a solution of water soluble organic polymer, formed from water soluble monomers and optionally also water insoluble monomers. The polymer solution may also contain water miscible volatile liquids, especially $C_{1-5}$ alcohols, $C_{3-5}$ ketones $C_{2-5}$ esters and $C_{2-5}$ ethers. Where the composition used in the method contains a water miscible organic liquid it is generally selected from the group consisting of $C_{1-5}$ alcohols, $C_{3-5}$ ketones, $C_{2-5}$ esters and $C_{2-5}$ ethers. Specifically this includes methanol, ethanol, n-propanol, isopropanol, tertiary butanol, acetone, methyl acetate, ethyl acetate, dimethyl ether, methyl ethyl ether, diethyl ether and iso-propyl methyl ether and any other water miscible volatile alcohol, ether or ketone.

However, in a preferred aspect the article is contacted with a composition in which the polymer is not in solution but exists as a dispersion. Typically the polymer is present as discrete particles of average diameter size of below 10 microns.

In one still preferred form the article is contacted with a composition which comprises water, a water soluble or water swellable organic polymer, an organic water miscible liquid selected from the group consisting of $C_{1-5}$ alcohols, $C_{3-5}$ ketones, $C_{2-5}$ esters and $C_{2-5}$ ethers, in which the polymer is present as discrete particles of average diameter size of below 10 microns.

Alternatively the article is contacted with a dispersion or emulsion or water soluble or water swellable polymer in a hydrocarbon liquid carrier. Such polymers may be prepared by water in oil emulsion polymerisation of water soluble monomers dispersed or emulsified in a hydrocarbon liquid. Typically such polymers may also be cross linked by the inclusion of cross linking agents. A detailed description is given in EP-A-202780.

It has surprisingly been found that the water resistance of various materials, including optical fibres and other components within a fibre optic cable can be improved by applying an aqueous pourable liquid composition which comprises water, especially water in an amount of at least 20 weight % water, based on total weight of composition. Preferably the amount of water present in the composition is in the range 20 to 40 weight %, more preferably in the range 25 to 30 weight %.

Generally the composition used in the method of improving the water or moisture resistance of an article and/or preventing ingress of water into an article comprises dispersed particles of water soluble or water swellable polymer.

The polymers may be formed entirely from an ethylenically unsaturated water soluble monomer or from a mixture of ethylenically unsaturated water soluble monomers.

In addition to ethylenically unsaturated water soluble monomer or monomer mixtures it is also possible to include some ethylenically unstaturated water insoluble monomers. Where ethylenically unsaturated water insoluble monomers are included it is preferred that they are present in an amount of up to 75 mole %. Preferably though the amount of ethylenically unsaturated water insoluble monomer is between 10 and 50 weight %, more preferably 20 to 40 weight % most preferably around 30 weight %. Examples of ethylenically unsaturated water insoluble monomers include styrene, vinyl acetate, acrylonitrile, methacrylic acid in free acid form, acrylic esters such as methyl methacrylate, butyl acrylate, 2-ethylhexyl acrylate, n-octyl acrylate, dodecyl acrylate, lauryl acrylate, stearyl acrylate. Many other acrylic esters would also be suitable for the purposes of this invention.

It is also possible to include into the monomer mixture ethylenically unsaturated amphiphilic monomers such as $C_{8-30}$ alkyl ethoxylated meth)allyl ethers, $C_{8-30}$ alkyl ethoxylated (meth)acrylate and $C_{8-30}$ alkyl ethoxylated (meth)acrylamide. Typically such ethylenically unsaturated amphiphilic monomer could be present in the monomer mixture in an amount up to 20 weight %. Preferably this would be between 1 and 15 weight %, more preferably between 5 and 10 weight %.

In one preferred composition the polymer is formed from a monomer mixture consisting of, 25 to 90 mole % monomer or monomers selected from the group consisting of meth) acrylamide, (meth)acrylic acid or salts thereof, 10 to 75 mole % monomer or monomers selected from the group consisting of $C_{8-30}$ alkyl (meth)acrylates, $C_{8-30}$ alkyl ethoxylated (meth)acrylates, $C_{8-30}$ alkyl (meth)acrylamides, $C_{8-30}$ alkyl ethoxylated (meth)acrylamides, $C_{8-30}$ alkyl (meth)allyl ethers and $C_{8-30}$ alkyl ethoxylated (meth)allyl ethers.

Desirably the polymer comprises 25 to 75 mole %, preferably 50 to 60 mole %, monomer or monomers selected from the group consisting of (meth)acrylamide, (meth)acrylic acid or salts thereof, and 25 to 75 mole %, preferably 40 to 50 mole % monomer or monomers selected from the group consisting of $C_{8-30}$ alkyl (meth)acrylates, $C_{8-30}$ alkyl ethoxylated (meth)acrylates, $C_{8-30}$ alkyl (meth)acrylamides, $C_{8-30}$ alkyl ethoxylated (meth)acrylamides, $C_{8-30}$ alkyl (meth)allyl ethers and $C_{8-30}$ alkyl ethoxylated (meth)allyl ethers.

Where the polymer is formed from a higher proportion of water soluble monomer, for example above 60 mole %, particularly above 70 or 80 mole % it may be desirable for the polymer to be branched or cross linked. The level of cross linking agent applied depends on the particular monomers and cross linking agent used. If the polymer is too cross linked then the polymer may not be able to swell sufficiently and this could result in an inability to provide the article with sufficient water resistance.

Generally the method is applicable to articles which contain water sensitive material within a more durable exterior, which is prone to fracture, rupture or developing fissures through which water can be transmitted. The method is applicable to articles that comprise one or more of the group consisting of glass, plastic, rubber and metal. Generally the method is of particular value when the article is a sheet, a fibre or a cable. For instance the method is especially applicable for electrical cables and fibre optic cables and components thereof.

A further aspect of the invention is a process of imparting water resistance to one or more of the inner components of a cable, said process comprises, contacting at least one of said inner components with a pourable liquid composition which comprises, water, a water soluble or water swellable organic polymer, and an organic water miscible liquid selected from the group consisting of $C_{1-5}$ alcohols, $C_{3-5}$ ketones and $C_{2-5}$ ethers, passing the coated inner components to a drying stage, and then processing the inner components further to form said cable, characterised in that the organic polymer is present in the pourable liquid composition as discrete particles of average diameter size of below 10 microns.

The components of the cable may be any of the internal components of the cable. For instance where the cable is a fibre optic cable, the process can be applied to any of the optical fibres or other fibres or strands within the cable. The process may also be applied to the individual components within electrical cables.

Desirably the components of the cable are drawn through a coating die from which the liquid composition is applied. The coated cable component is then passed through a heating stage where the composition is dried.

In the process the composition should be sufficiently fluid so as to be applied from the coating die onto the cable component. The polymers may be formed entirely from an ethylenically unsaturated water soluble monomer or from a mixture of ethylenically unsaturated water soluble monomers.

The process is of particular value to fibre optic cables. It has been found that the process of this invention provides fibre optic cables with a high degree of water resistance and overcomes the serious disadvantages of the other known processes of treatment.

The coated cable component can be dried at a temperature of between 50 and 120° C., preferably 60 to 90° C., more preferably 70 to 80° C. for no longer than 10 minutes, preferably no longer than 5 minutes. The process can be operated with an even shorter drying period, in particular up to 2 minutes, especially 1 to 2 minutes. This is especially valuable when coating optical fibres in the construction of fibre optic cables.

The following examples illustrate the invention.

EXAMPLE 1
Preparation of Polymer A

A monomer mixture comprising 100.0 parts acrylamide, 46.7 parts behenyl ethoxy (25) methacrylate, 23.3 parts methacrylic acid, 8.0 parts sodium hydroxide, 191.3 parts t-butanol, 49.4 parts water and 1.7 parts tetraallylammonium chloride is prepared.

An initiator mixture is prepared by mixing 35.5 parts t-butanol, 13.8 parts water and 3.73 parts tertiary butyl peroxy pivalate.

A solvent mixture is prepared comprising 103.8 parts of t-butanol, 45.5 parts of water and 0.93 parts tertiary butyl peroxy pivalate.

The solvent mixture is added to a 700 ml flask and heated to reflux. The monomer mixture is added over 3 hours whilst the initiator mixture is added over 4 hours, whilst maintaining under reflux. A stable dispersion of polymer in a continuous medium of t-butanol and water is formed.

EXAMPLE 2
Preparation of Polymer B

Example 1 is repeated except using 0.85 parts instead of 1.7 parts tetraallyl ammonium chloride. A stable dispersion of polymer in a continuous medium of t-butanol and water is formed.

EXAMPLE 3
Preparation of Polymer C

Example 1 was repeated except using no tetraallyl ammonium chloride. A stable dispersion of polymer in a continuous medium of t-butanol and water is formed.

EXAMPLE 4
Preparation of Polymer D

Example 1 was repeated except using ethanol in place of t-butanol and 4.25 parts of tetraallylammonium chloride instead of 1.7 parts.

EXAMPLE 5
Preparation of Polymer E

A monomer mixture is prepared by mixing 1301.2 parts acrylic acid, 128.7 parts hydroxyethyl acrylate.

An initiator mixture is prepared by mixing 510.7 parts water and 4.1 part ammonium persulphate.

A solvent mixture is prepared by mixing 5801.3 parts of water, 4.1 parts of sodium EDTA and 2.45 parts ammonium persulphate.

The solvent mixture is added to a 1000 ml flask and heated to 85° C. The monomer mixture is added over 2 hours whilst the initiator mixture is added over 2.5 hours, whilst maintaining the temperature. To this is added 50% potassium hydroxide solution in two stages. The resulting aqueous polymer solution is allowed to cool and then the pH is adjusted to between 8 and 8.5. To this is added ammonium zirconium carbonate at a level of 0.2% dry on dry.

EXAMPLE 6
Preparation of Polymer F 100 g of a linear associative copolymer of ethyl acrylate/methacrylic acid/stearyl ethoxy(10) allyl ether in a weight ratio of 50/40/10 is dissolved in a mixture of 12.1 g sodium hydroxide solution (46%), 20.3 g water and 33.1 g isopropanol.

EXAMPLE 7
Preparation of Polymer G

Example 6 is repeated except using 100 g of a coss linked associative copolymer of ethyl acrylate/methacrylic acid/stearyl ethoxy(10) allyl ether/diallyl phthalate in place of the linear associative copolymer in a weight ratio of 50/40/10/0.02.

EXAMPLE 8
Preparation of Polymer H

A monomer mixture comprising 100 parts dimethylaminoethyl methacrylate, quaternised with methyl chloride, 0.2 parts methylene bis acrylamide, 1 part citric acid and 36.6 parts water were mixed under high shear with 200 parts ethyl acetate/dimethyl amino ethyl methacrylate of molecular weight approximately 20,000.

The dispersion was degassed using nitrogen, then the polymerisation was initiated with a continues feed of 0.1% aqueous solution of sodium metabisulphate and 0.1% tertiary butyl hydroperoxide at a rate of 0.1 ml/min at a starting temperature of 10° C. until polymerisation was complete at 40° C.

EXAMPLE 9
Preparation of Polymer I

A water in oil emulsion copolymer of 50 weight % dimethylamino ethyl acrylate and 50 weight % acrylamide and 250 ppm methylene bis acrylamide is prepared in accordance with EP-A-202780.

EXAMPLE 10

Testing of the Water Blocking Properties of Polymers A to G

For each test a channel 5 mm wide, 200 microns deep and 600 mm long in a clear polyester block is filled to a depth of 100 microns with each liquid polymer composition. The liquid polymer composition is allowed to dry and then a clear polyester top plate is fixed to the top surface of the polyester block to provide a channel with an opening at each end. The polyester block is then positioned so that the channel runs vertically. A funnel is positioned in the upper opening of the channel. 20 ml of water containing a dye is then poured into the funnel. The distance travelled by the water is measured and the results are shown in Table 1.

TABLE 1

| Polymer | Distance/mm |
| --- | --- |
| A | 132 |
| B | 193 |
| C | 11 |
| D | 242 |
| E | 110 |
| F | 194 |
| G | 162 |
| H | 23 |
| I | 86 |

Effective water blocking polymers prevent the water travelling the distance of the channel. The shorter the distance travelled by the water, the more effective the polymer is.

EXAMPLE 11
Drying Time for Each Liquid Polymer Composition

A sheet is coated with each liquid polymer composition and then dried at a temperature of 110° C. The time taken to become dry is shown in table 2.

TABLE 2

| Polymer | Drying time/secs |
| --- | --- |
| A | 39 |
| B | 33.5 |
| C | 45 |
| D | 34.5 |
| E | 588 |
| F | 467 |
| G | 467 |
| H | 3 |
| I | 105 |

As can be seen the drying time for the polymer compositions shows that the best results are obtained from polymer A to D and polymer H.

What is claimed is:

1. A pourable liquid composition comprising,
   a) water,
   b) a water soluble or water swellable organic polymer in which the polymer is formed from a monomer mixture comprising 25 to 90 mole % monomer or monomers selected from the group consisting of (meth)acrylamide, (meth)acrylic acid or salts thereof and 10 to 75 mole % monomer or monomers selected from the group consisting of $C_{8-30}$ alkyl ethoxylated (meth)acrylates, $C_{8-30}$ alkyl ethoxylated (meth)acrylamides, $C_{8-30}$ alkyl (meth)allyl ethers and $C_{8-30}$ alkyl ethoxylated (meth)allyl ethers, and
   c) a water miscible organic volatile liquid,
   characterized in that the organic polymer is present as discrete particles of average diameter size of below 10 microns.

2. A composition according to claim 1 in which the organic volatile liquid is selected from the group consisting of $C_{1-5}$ alcohols, $C_{3-5}$ ketones, $C_{2-5}$ esters and $C_{2-5}$ ethers.

3. A composition according to claim 1 in which the composition comprises at least 20 weight % water, based on total weight of composition.

4. A composition according to claim 1 in which the polymer is formed from ethylenically unsaturated water soluble monomer or monomer mixture.

5. A composition according to claim 1 in which the polymer is cross-linked.

6. A method of improving the water or moisture resistance of an article and/or preventing ingress of water into an article by contacting the said article with a pourable liquid composition,
   wherein the composition comprises,
   a water soluble or water swellable organic polymer formed from a monomer mixture comprising
      1) 25 to 90 mole % monomer or monomers selected from the group consisting of (meth)acrylamide, (meth)acrylic acid or salts thereof and
      2) 10 to 75 mole % monomer or monomers selected from the group consisting of $C_{8-30}$ alkyl (meth)acrylates, $C_{8-30}$ alkyl ethoxylated (meth)acrylates, $C_{8-30}$ alkyl (meth)acrylamides, $C_{8-30}$ alkyl ethoxylated (meth)acrylamides, $C_{8-30}$ alkyl (meth)allyl ethers and $C_{8-30}$ alkyl ethoxylated (meth)allyl ethers,
   characterized in that,
      (a) the polymer comprises 90 to 100 mole % units of (meth)acrylic acid or salts thereof and 0 to 10 mole % hydroxyethyl acrylate,
      (b) the composition additionally comprises an organic water miscible liquid selected from the group consisting of $C_{1-5}$ alcohols, $C_{3-5}$ ketones, $C_{2-5}$ esters and $C_{2-5}$ ethers, or
      (c) the polymer is present as discrete particles of average diameter size of below 10 microns in an aqueous or non-aqueous liquid.

7. A method according to claim 6 in which the composition comprises at least 20 weight % water, based on total weight of composition.

8. A method according to claim 6 in which the article is constructed from a material selected from one or more of the group consisting of glass, plastic, rubber and metal.

9. A method according to claim 6 in which the article is in the form of a sheet, a fiber or a cable.

10. A process of imparting water resistance to one or more of the inner components of a cable,
    said process comprises,
       a) contacting at least one of said inner components with a pourable liquid composition which comprises,
          i) water,
          ii) a water soluble or water swellable organic polymer, and
          iii) an organic water miscible liquid selected from the group consisting of $C_{1-5}$ alcohols, $C_{3-5}$ ketones, $C_{2-5}$ esters and $C_{2-5}$ ethers,
       b) passing the coated inner components to a drying stage, and
       c) then processing the inner components further to form said cable,
    characterized in that the organic polymer is present in the pourable liquid composition as discrete particles of average diameter size of below 10 microns.

11. A process according to claim 10 in which the polymer is formed from a monomer mixture comprising
    a) 25 to 90 mole % monomer or monomers selected from the group consisting of (meth)acrylamide, (meth)acrylic acid or salts thereof and
    b) 10 to 75 mole % monomer or monomers selected from the group consisting of $C_{8-30}$ alkyl (meth)acrylates, $C_{8-30}$ alkyl ethoxylated (meth)acrylates, $C_{8-30}$ alkyl (meth)acrylamides, $C_{8-30}$ alkyl ethoxylated (meth)acrylamides, $C_{8-30}$ alkyl (meth)allyl ethers and $C_{8-30}$ alkyl ethoxylated (meth)allyl ethers.

12. A process according to claim 10 in which the components are optical fibers of a fiber optic cable.

13. A process according to claim 10 in which the composition is dried for a period not exceeding 10 minutes at a temperature of between 50 and 120° C.

14. A process according to claim 10 in which the composition is dried for a period not exceeding 5 minutes at a temperature of between 50 and 120° C.

15. A process according to claim 10 in which the composition is dried for a period not exceeding 2 minutes at a temperature of between 50 and 120° C.

* * * * *

UNITED STATES PATENT AND TRADEMARK OFFICE
CERTIFICATE OF CORRECTION

PATENT NO.     : 6,620,878 B1
DATED          : September 16, 2003
INVENTOR(S)    : Ian Russell Lyons et al.

It is certified that error appears in the above-identified patent and that said Letters Patent is hereby corrected as shown below:

<u>Title page,</u>
Item [75], should read:
-- [75]  Ian Russell Lyons, Keighley (GB);
         Howard Roger Dungworth, Halifax (GB) --.

Signed and Sealed this

Thirtieth Day of December, 2003

JAMES E. ROGAN
*Director of the United States Patent and Trademark Office*